Figure 1:
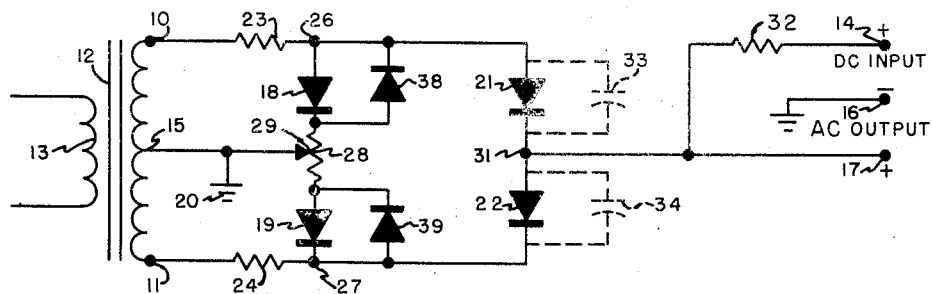

Nov. 3, 1959

W. LEHMAN 2,911,597

MODULATION SYSTEM

Filed Oct. 7, 1957

INVENTOR.
WALTER LEHMAN

BY *H. S. Mackey*

ATTORNEY.

United States Patent Office 2,911,597
Patented Nov. 3, 1959

2,911,597
MODULATION SYSTEM

Walter Lehman, Elmsford, N.Y., assignor to General Precision Laboratory Incorporated, a corporation of New York Application October 7, 1957, Serial No. 688,598
1 Claim. (Cl. 332—52)

This invention relates to a system usually called a modulation or detection system. More particularly it is of the bridge circuit type and when it is used for mixing alternating currents such systems are referred to variously as frequency changers, mixer-modulators, or demodulators. In the present invention, the system is used where an alternating voltage, commonly called the carrier, which serves as the keying or triggering voltage, is applied to one pair of conjugate points of a bridge to control the coupling between a source of direct current voltage, constituting the input, and an output circuit. When so used such a system may be considered as a direct current amplifier or a square wave generator. It may also be considered as an inverter system because, in effect, what it does is to convert direct voltage to an alternating voltage.

Such systems, particularly when used in the latter sense, in effect, constitute a coupling network which periodically connects the input to the output circuit in a special way to produce the desired output waveform.

The primary object of the present invention is to provide an improved system in which this coupling between the direct voltage input and the output circuit has improved efficiency and wherein the pulsed direct current output is responsive to a much lower input voltage and constitutes a more accurate analog of the input voltage.

The system of the present invention is particularly adapted to, and the invention is illustrated in connection with, the direct current voltage error signal of a servo system where it is desired to convert the direct current error voltage to an A.C. error voltage so that it can be more readily amplified and controlled. Systems of this general nature are known, per se, but in these prior devices there has ben difficulty in effecting an efficient coupling between the input and output circuits, and, accordingly, the transfer characteristic between the input and output usually departs from linearity at low signal levels. In view of the fact that the invention relates to an environment in which both the magnitude and sense of the input voltage varies it is extremely important that the output voltage be a very accurate analog of input voltage, particularly for very low values of the input voltage.

Another object of the invention is to provide an improved circuit of the type generally described which reduces to a minimum the amount of the alternating voltage component of the carrier voltage that is coupled into the output circuit.

A specific object is to eliminate the capacitive coupling of the devices in the bridge circuit.

Another object is to provide such a coupling circuit in which the keying or carrier alternating voltage may be of any magnitude without damaging the components of the bridge circuit.

Figure 2:
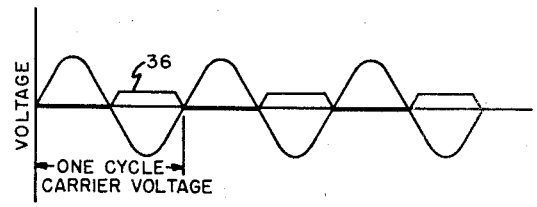
Figure 3:
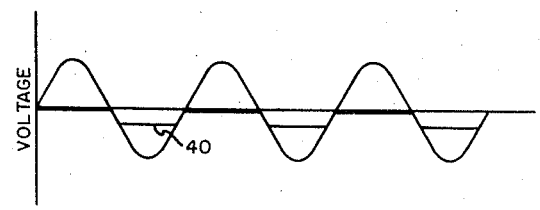

Other and further objects will become readily apparent from the following description when considered in connection with the accompanying drawings, in which:

Figure 1 is a diagrammatic illustration of the present invention;

Figure 2 graphically illustrates the operation of the invention when the polarity of the direct voltage input is positive; and Figure 3 is a graphical representation of the operation when the polarity of the direct voltage input is negative.

Broadly speaking, the system of the present invention comprises a bridge circuit having the conventional two branches with two arms per branch. As illustrated in the drawing, each arm of the bridge circuit has at least one asymmetrical conductor but as it will be pointed out hereinafter, it is not necessary that all of these arms have asymmetrical conductors under certain conditions. The type of asymmetrical conductors that are commercially available for use in such bridge circuits also have nonlinear characteristics which enter into the operation of such devices. As seen in Fig. 1, an alternating carrier or keying voltage is applied across one pair of conjugate points of the bridge circuit, which are common to both branches, and a direct voltage constituting the input source is connected across the second pair of conjugate points. The asymmetrical conductors, or diodes, are so poled and the parameters of the circuit are so chosen that the bridge will be balanced across the direct voltage pair of conjugate points for one polarity of the alternating voltage when the diodes in that branch are conducting and will be open circuited for the other polarity of the alternating voltage. During the half-cycle intervals when the diodes in both branches are conducting the voltage across the output circuit will be clamped to zero and during the other half cycles the output voltage will be that of the direct voltage input.

Referring to Fig. 1, a source of alternating current carrier voltage for the modulating or inverting system is supplied at the terminals 10 and 11 of the secondary of the transformer 12, the primary 13 of which is supplied from a suitable alternating voltage of the desired frequency. A direct current input voltage, which may be the error voltage fom a servo loop, is supplied to terminals 14 and 16 while the alternating current output is supplied between the terminals 16 and 17. The bridge circuit comprises a pair of asymmetrical conductors, or diodes, 18 and 19 in one branch and a second pair of asymmetrical conductors, or diodes, 21 and 22 in the other branch of the bridge. All of these diodes are poled in the same direction as shown. The carrier or keying voltage at the terminals 10 and 11 is supplied through suitable high resistors 23 and 24 to the terminals 26 and 27 common to both branches of the bridge and constituting one pair of conjugate points for the bridge circuit. A potentiometer 28 of very low total resistance between the diodes 18 and 19 is adjustable for the purpose of balancing the bridge. The second pair of conjugate points comprises the bridge balancing point 29 on the resistor 28 and the terminal 31 which is the electrical junction between diodes 21 and 22. The direct current voltage input between terminals 14 and 16 is supplied across the conjugate terminals 29 and 31 through a high resistor 32. The secondary of the transformer 12 has a center tap 15 connected to the balancing point 29 on resistor 28 and to ground at 20.

The asymmetrical devices or diode rectifiers 18, 19, 21 and 22 are the type commercially available and may be silicon, germanium, or selenium diode rectifiers and the like. Such devices have inherent capacitance as indicated in dotted outlines at 33 and 34, which is a function of the voltage drop across them. Obviously this inherent capacitance has no effect when the polarity is such that the current is flowing through the device in the forward direction. However, these diodes effectively become open circuited when the polarity is reversed and therefore the carrier voltage between terminals 10 and 11 is applied across the diodes 21 and 22 in series. Since the inherent capacitance of the diodes is a function of the back voltage across the diodes any appreciable voltage drop across the diodes 21 and 22 would cause some of the carrier voltage to be coupled into the alternating current output circuit between terminals 16 and 17. This is a highly undesirable situation and the primary purpose of this invention is to eliminate this coupling between the carrier or keying voltage and the output circuit between terminals 16 and 17. This is particularly true because the direct current input voltage across the terminals 14 and 16 is an error voltage from a servo loop and it is desired to produce an alternating or pulsed direct current voltage analog across terminals 16 and 17 which follows the direct current input at very close tolerances, both as to amplitude and sense.

Accordingly, in order that the arms of the branch which includes the potentiometer 28 remain balanced so that the conjugate points 26 and 27 are electrically symmetrical with respect to ground and in order to eliminate the back-voltage drops across these arms during the other half cycles, diode 38 is connected in back-to-back parallel relation with diode 18 while a similar diode 39 is connected in back-to-back parallel relation with diode 19. Diodes 38 and 39 are so selected that their asymmetrical and non-linear characteristics match as nearly as possible so that there will be substantially no A.C. ripple fed into the D.C. output circuit. These diodes 38 and 39 in effect limit and square off the back voltage across the respective diodes 21 and 22 and therefore greatly reduce the capacitive coupling between the alternating carrier voltage across the terminals 10 and 11 and the output voltage between terminals 16 and 17.

In the operation of the device, when the terminal 10 is positive and the terminal 11 is negative, the alternating voltage conjugate points 26 and 27 of the bridge will be balanced as the current flows through diodes 18, 19, 21 and 22. This, in effect, grounds terminal 31 which is connected directly to output terminal 17 and therefore the output voltage between terminals 16 and 17 is zero. As another way of looking at it, it will be noted that the center-tapped secondary of the transformer 12, the resistors 23, 24, 28 and the back-to-back diodes 18, 38 and 19, 39, effectively constitute a second bridge circuit having a grounded conjugate point 29 common to this bridge and the bridge circuit previously mentioned as constituted by the two branches across terminals 26, 27. Therefore, when current flows through like poled diodes 18, 19, 21 and 22 of the two branches, point 31 which is conjugate to point 29 will be at the same potential as the latter and the direct current input is decoupled from the output. During the other half cycle of the carrier voltage of opposite polarity, the terminal 10 will be negative and the terminal 11 will be positive and in effect the diodes 18, 19, 21 and 22 will be open circuited and as far as the direct current voltage between terminals 14 and 16 is concerned the bridge will be unbalanced and terminal 31 will be free to assume the polarity and the voltage between terminals 14 and 16. Accordingly, this voltage will be applied across the output terminals 16 and 17 as indicated by the positive direct current pulse 36 indicated in Fig. 2. This, of course, will be repeated for following cycles so long as the terminal 14 is positive. It should be remarked at this point that in view of the fact that diodes 38 and 39 are connected across and poled oppositely to the respective diodes 18 and 19, the bridge circuit which might be considered to include the secondary of the transformer 12, the resistors 23, 24 and 29 and the intervening diodes will always be balanced for both polarities of alternating voltage. However, because the diodes 21 and 22 are poled so that they permit current to flow from the keying source only when terminal 10 is positive and terminal 11 is negative, the direct current source between terminals 14 and 16 will be coupled into the output circuit between terminals 16 and 17 only when the back voltage of the opposite polarity of the half cycle of the alternating voltage effectively opens diodes 21 and 22.

Now assume that the direct current input terminal 14 is negative. During the positive half cycle of the carrier or trigger voltage between terminals 10 and 11 the operation will be the same as before since no current can flow through the diodes 18, 19, 21 and 22 and therefore the voltage on terminal 31 and the output terminal 17 will be zero as before. However, on the negative half cycle of the triggering voltage when terminal 10 is negative and terminal 11 is positive, the terminal 31 will be isolated from the alternating voltage as described in connection with the previous negative half cycle but now the terminal 31 and the output terminal 17 will assume the negative voltage applied at terminal 14 to provide a negative square output pulse at 40 as illustrated in Fig. 3. These negative square pulses will be repeated as long as the terminal 14 remains negative. It is to be understood, of course, that the maximum values of the rectangular direct current pulses 36 and 40 are dependent upon the magnitude of the direct voltage input on the terminal 14.

It will be seen from the above description that the carrier voltage between the terminals 10 and 11 may be of any magnitude irrespective of the reverse voltage rating of the diode devices since the voltage across the diodes can never exceed the forward voltage. In this way the diodes will be protected from damage due to any high peak voltages which might be present in the circuit. It should be noted that the diodes 18 and 38 connected in parallel back-to-back relation and the diodes 19 and 39 connected in parallel back-to-back relation in effect constitute non-linear conductors and if their characteristics are sufficiently matched they constitute symmetrical conductors which have only the non-linear characteristic. If such symmetrically non-linear devices were available they could be used between the points 26 and 29, and 27 and 29, to keep the bridge balanced for polarities of the alternating voltage when the diodes 21 and 22 are conducting. However, since these devices are not available, the invention is illustrated by the circuit wherein the diodes are connected in back-to-back relation. The non-linearity of the characteristics of diodes 38 and 39 is not important in the opposite direction so long as their forward voltage is low so that they completely shunt the diodes 21 and 22, respectively, as far as the carrier voltage is concerned.

What is claimed is:

A coupling circuit for selectively coupling a direct current input voltage source to an output circuit in response to an alternating carrier voltage comprising a bridge circuit having two parallel branches, one of said branches including two asymmetrically conducting devices connected in series across one pair of conjugate points of said bridge, said asymmetrical devices being poled in series aiding relation and having non-linear capacitive characteristics which are functions of the voltage drops across said asymmetrical devices, the other of said branches including two asymmetrical conducting devices connected in series aiding relation and connected across said pair of conjugate points so that a voltage applied to said points will affect all of said devices in the same phase, an asymmetrical device connected in parallel back-to-back across each device in said second branch, a source of alternating carrier voltage connected to said first pair of conjugate points, a direct current input voltage connected to a second pair of conjugate points including one which is common to both of said devices in said first branch circuit, an output circuit connected to said second pair of conjugate points, said devices connected in back-to-back relation to the devices in said second branch serving to shunt the devices in said first branch and eliminate the capacitive coupling between the alternating carrier voltage and said output circuit when said devices in said first branch are not conducting.

References Cited in the file of this patent

UNITED STATES PATENTS

| | | |
|---|---|---|
| 2,414,317 | Middel | Jan. 14, 1947 |
| 2,438,948 | Riesz | Apr. 6, 1948 |
| 2,724,742 | Chesnut | Nov. 22, 1955 |
| 2,799,829 | Gordon et al. | July 16, 1957 |